(12) United States Patent
Hintzer et al.

(10) Patent No.: US 9,938,403 B2
(45) Date of Patent: Apr. 10, 2018

(54) HIGHLY FLUORINATED POLYMERS

(71) Applicant: 3M INNOVATIVE PROPERTIES COMPANY, St. Paul, MN (US)

(72) Inventors: Klaus Hintzer, Kastl (DE); Harald Kaspar, Burgkirchen (DE); Herbert Koenigsmann, Burgkirchen (DE); Helmut Traunspurger, Julbach (DE); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/992,223

(22) Filed: Jan. 11, 2016

(65) Prior Publication Data

US 2016/0122522 A1 May 5, 2016

Related U.S. Application Data

(62) Division of application No. 14/646,980, filed as application No. PCT/US2013/071152 on Nov. 21, 2013, now Pat. No. 9,260,553.

(60) Provisional application No. 61/732,967, filed on Dec. 4, 2012.

(51) Int. Cl.
  *C08L 27/18* (2006.01)
  *C08F 214/26* (2006.01)

(52) U.S. Cl.
  CPC .......... *C08L 27/18* (2013.01); *C08F 214/262* (2013.01)

(58) Field of Classification Search
  CPC ................ C08F 214/262; C08L 27/18
  USPC ....... 524/544, 545, 805; 526/242; 525/326.4
  See application file for complete search history.

(56) References Cited

U.S. PATENT DOCUMENTS

| | | | |
|---|---|---|---|
| 3,085,083 A | 4/1963 | Schreyer | |
| 4,675,380 A | 6/1987 | Buckmaster | |
| 4,687,708 A | 8/1987 | Batzar | |
| 5,285,002 A | 2/1994 | Grootaert | |
| 5,453,477 A | 9/1995 | Oxenrider | |
| 5,804,650 A * | 9/1998 | Tsuda | C08F 214/22 524/805 |
| 6,541,588 B1 | 4/2003 | Kaulbach | |
| 6,624,328 B1 | 9/2003 | Guerra | |
| 6,833,403 B1 | 12/2004 | Bladel | |
| 7,671,112 B2 | 3/2010 | Hintzer | |
| 2007/0015865 A1 | 1/2007 | Hintzer | |
| 2007/0060699 A1* | 3/2007 | Tsuda | C08F 14/26 524/544 |
| 2008/0015319 A1 | 1/2008 | Hintzer | |
| 2009/0234086 A1* | 9/2009 | Kishine | C08F 14/18 526/245 |
| 2010/0204345 A1 | 8/2010 | Yamanaka et al. | |
| 2011/0015283 A1 | 1/2011 | Tomita | |
| 2011/0294951 A1 | 12/2011 | Hintzer | |

FOREIGN PATENT DOCUMENTS

| | | |
|---|---|---|
| CA | 2522837 | 6/2000 |
| DE | 19903657 | 8/2000 |
| EP | 222945 | 5/1987 |
| EP | 779335 | 12/2001 |
| EP | 1681308 | 7/2006 |
| EP | 1736487 | 12/2006 |
| EP | 1739099 | 1/2007 |
| EP | 1739100 | 1/2007 |
| EP | 2258675 | 12/2010 |
| JP | 59-196308 | 11/1984 |
| JP | 2001-048922 | 2/2001 |
| RU | 2158274 | 10/2000 |
| WO | WO 1996-24622 | 8/1996 |
| WO | WO 1997-17381 | 5/1997 |
| WO | WO 2002-088203 | 11/2002 |
| WO | WO 2002-088206 | 11/2002 |
| WO | WO 2002-088207 | 11/2002 |
| WO | WO 2007-120346 | 10/2007 |
| WO | WO 2008/001894 | 1/2008 |
| WO | WO 2009/020187 | 2/2009 |
| WO | WO 2009-049168 | 4/2009 |
| WO | WO 2012-030784 | 3/2012 |
| WO | WO 2012-082707 | 6/2012 |
| WO | WO 2012-088258 | 6/2012 |

OTHER PUBLICATIONS

Pich, "Polymeric Particles Prepared with Fluorinated Surfmer," Polymer, 2005, vol. 46, pp. 1323-1330.

* cited by examiner

*Primary Examiner* — Kelechi Egwim

(74) *Attorney, Agent, or Firm* — Julie Lapos-Kuchar

(57) ABSTRACT

A method of making a highly fluorinated polymers and resulting aqueous mixtures. The method comprising polymerizing one or more perfluorinated monomers in an aqueous emulsion polymerization in the presence of a polymerizable fluorinated emulsifier to form a perfluorinated polymer. The polymerizable fluorinated emulsifier has the formula $X_2C=CX(CF_2)_m(CH_2)_n[O-(CX_2)_p]_q-[O-(CX_2)_r]_s-[O-(CX_2-CX_2)]_t-[(O)_w-(CX_2)_u]_v-[CH_2]_z-Y$. The method also provides for isolating the highly fluorinated polymer and post-fluorinating the isolated highly fluorinated polymer.

7 Claims, No Drawings

HIGHLY FLUORINATED POLYMERS

CROSS REFERENCE TO RELATED APPLICATIONS

This application is a divisional application of U.S. application Ser. No. 14/646,980, filed May 22, 2015, now allowed, which is a national stage filing under 35 U.S.C. 371 of PCT/US2013/071152, filed Nov. 21, 2013, which claims priority to U.S. Provisional Application No. 61/732,967, filed Dec. 4, 2012, the disclosure of which is incorporated by reference in its/their entirety herein.

TECHNICAL FIELD

A method for making highly fluorinated polymers using a polymerizable fluorinated emulsifier is described.

SUMMARY

Fluoropolymers, i.e. polymers having a fluorinated backbone, have been long known and have been used in a variety of applications because of several desirable properties such as heat resistance, chemical resistance, weatherability, UV-stability, etc.

A frequently used method for producing fluoropolymers involves aqueous emulsion polymerization of one or more fluorinated monomers using a fluorinated emulsifier.

An aqueous emulsion polymerization wherein no emulsifier is used has been described in U.S. Pat. No. 5,453,477, WO 96/24622 and WO 97/17381 to generally produce homo- and copolymers of chlorotrifluoroethylene (CTFE). For example, WO 97/17381 discloses an aqueous emulsion polymerization in the absence of an emulsifier wherein a radical initiator system of a reducing agent and oxidizing agent is used to initiate the polymerization and whereby the initiator system is added in one or more further charges during the polymerization. So-called emulsifier free polymerization has further been disclosed in WO 02/88206 and WO 02/88203. In the latter PCT application, the use of dimethyl ether or methyl tertiary butyl ether is taught to minimize formation of low molecular weight fractions that may be extractable from the fluoropolymer. WO 02/88207 teaches an emulsifier free polymerization using certain chain transfer agents to minimize formation of water soluble fluorinated compounds. An emulsifier free polymerization is further disclosed in RU 2158274 for making an elastomeric copolymer of hexafluoropropylene and vinylidene fluoride. However, emulsifier free polymerizations have some disadvantages such as e.g., large particle sizes.

Thus, the aqueous emulsion polymerization process in the presence of fluorinated emulsifiers is still a desirable process to produce fluoropolymers because it can yield stable fluoropolymer particle dispersions in high yield and in a more environmental friendly way than for example polymerizations conducted in an organic solvent. Traditionally, the emulsion polymerization process is carried out using a perfluoroalkanoic acid or salt thereof as an emulsifier. These non-polymerizable emulsifiers are typically used as they provide a wide variety of desirable properties such as high speed of polymerization, good copolymerization properties of fluorinated olefins with comonomers, small particle sizes of the resulting dispersion can be achieved, good polymerization yields (i.e. a high amount of solids can be produced), good dispersion stability, etc., however, environmental concerns have been raised with these emulsifiers.

Accordingly, measures have been taken to replace the perfluoroalkanoic acid or salt thereof with alternative emulsifiers having an improved environmental profile as disclosed in U.S. Pat. Publ. No. 2007/0015865 (Hintzer et al.). However, such alternative emulsifiers can be expensive and difficult to make. Additionally, and/or alternatively, these non-polymerizable fluorinated emulsifiers may be removed from the aqueous dispersion and waste streams as disclosed in U.S. Pat. No. 6,833,403 (Blaedel, et al.). However, the removal adds an additional processing step and/or cost.

Thus, there is a desire to provide an aqueous polymerization method using a fluorinated emulsifier, which does not require removal of the fluorinated emulsifier post polymerization, and wherein the resulting aqueous emulsion is substantially free of the fluorinated emulsifier. In one embodiment, it is desirable to identify a method to manufacture highly fluorinated polymers that is simple and/or lower cost.

In one aspect, method of making a highly fluorinated polymer is described comprising:

(i) polymerizing one or more perfluorinated monomers in an aqueous emulsion polymerization in the presence of a polymerizable fluorinated emulsifier to form a perfluorinated polymer, wherein the polymerizable fluorinated emulsifier is selected from:

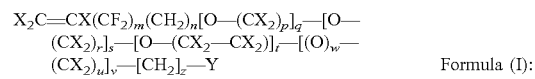

Formula (I):

where X is independently selected from H, F, or $CF_3$; Y is COOM or $SO_3M$; m is 0-5, n is 0-5, p is at least 1, q is 0-5, r is 0-5, s is 0-5, t is 0-5, u is 0-5, v is 0-5, w is 0 or 1, and z is 0-5; wherein at least one of m, n, q, s, t, u, v, and z is at least 1; and M is H, an alkali metal, or $NH_4$; wherein the polymerizable fluorinated emulsifier (a) comprises at least 1 fluorine atom; (b) is substantially free of telogenic activity, and (c) is less than 1 wt % based on the total weight of monomers used;

(ii) isolating the highly fluorinated polymer; and
(ii) post-fluorinating the isolated highly fluorinated polymer.

In one embodiment, the polymerizable fluorinated emulsifier is selected from the group consisting of:

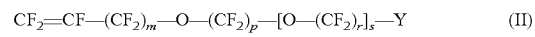 (II)

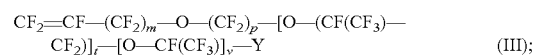 (III);

and

 (IV)

where X is independently selected from H, F, or $CF_3$; where Y is COOM or $SO_3M$, m is an integer selected from 0-5, p is at least 1, r is an integer selected from 0-5, s is an integer selected from 1-5, t is an integer selected from 1-5, v is an integer selected from 1-5, and M is H, an alkali metal, or $NH_4$.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The goal of the present disclosure is to prepare a highly fluorinated polymer dispersion wherein the dispersion is stabilized and is substantially free of fluorinated emulsifier.

In the present disclosure, an acid-functionalized monomer (herein referred to as a polymerizable fluorinated emulsifier) is used, not to impart different properties onto the resulting final fluoropolymer, but to stabilize the fluoropolymer dispersion. Although not wanting to be limited by theory, it is believed that by adding a small amount of a polymerizable fluorinated emulsifier to an aqueous fluoropolymer polymerization, these acid-functionalized monomers are able to stabilize the polymerization, yet not impact the properties of the resulting fluoropolymer. Furthermore, because the acid-functionalized monomers are polymerized into the fluoropolymer, there may be no need for removal of them from the aqueous dispersion and/or the waste water. In a further embodiment, the resulting highly fluorinated polymer may be post-fluorinated to improve the overall end-use properties of the polymer (e.g., thermal degradation, discoloration, blistering, etc.).

The present disclosure is directed toward an aqueous emulsion polymerization that comprises perfluorinated monomers and a polymerizable fluorinated emulsifier. It has been found that emulsifiers of Formula (I) are effective in stabilizing the aqueous emulsion polymerization of fluoropolymers.

The polymerizable fluorinated emulsifiers of the present disclosure are those that correspond to formula (I):

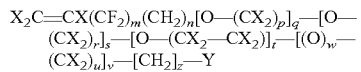

where X is independently selected from H, F, or $CF_3$; Y is COOM or $SO_3M$; wherein the polymerizable fluorinated emulsifier comprises at least 1 fluorine atom. M is H, an alkali metal (e.g., Na, Ca, etc.), or $NH_4$. Subscript m is 0-6, 0-5, 0-4; 0-3, or even 0-2. Subscript n is 0-6, 0-5, 0-4; 0-3, or even 0-2. Subscript p is at least 1, 2, 3, 4, or even 5; and no more than 20, 10, 8, or even 6. Subscript q is 0-6, 0-5, 0-4; 0-3, or even 0-2. Subscript r is 0-6, 0-5, 0-4; 0-3, or even 0-2. Subscript s is 0-6, 0-5, 0-4; 0-3, or even 0-2. Subscript r is 0-6, 0-5, 0-4; 0-3, or even 0-2. Subscript u is 0-6, 0-5, 0-4; 0-3, or even 0-2. Subscript v is 0-6, 0-5, 0-4; 0-3, or even 0-2. Subscript w is 0 or 1. Subscript z is 0-6, 0-5, 0-4; 0-3, or even 0-2. At least one of m, n, q, s, t, u, v, and z is at least 1.

The polymerizable fluorinated emulsifiers disclosed herein may be in their acid form or may be a salt, including for example, sodium, potassium, and ammonium salts.

The polymerizable emulsifier used in the present disclosure is fluorinated, therefore, the polymerizable emulsifier, must include at least 1 fluorine atom. Because the resulting polymers of the present disclosure are highly fluorinated, it is desirable that at least 50%, 75%, 90%, 95% or even 99% of the carbon-hydrogen bonds of the polymerizable fluorinated emulsifier be replaced by carbon-fluorine bonds. In one embodiment, the polymerizable emulsifier of the present disclosure is perfluorinated (or fully fluorinated).

In one embodiment, the polymerizable fluorinated emulsifier is selected from the group consisting of (i) fluorinated vinyl ethers, (ii) fluorinated allyl ethers, and (iii) fluorinated olefins.

In one embodiment, the polymerizable fluorinated emulsifier is a linear molecule and does not comprise any branching (e.g., a carbon substituent attached off the main chain of the molecule, e.g., $CF_2=CF-O-CF(CF_3)-Y$ is branched).

Fluorinated vinyl ethers include those of formulas:

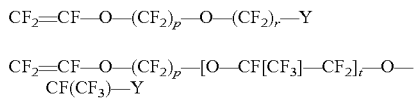

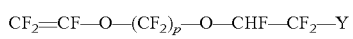

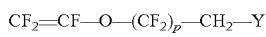

and

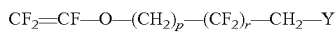

where Y is COOM or $SO_3M$. M is H, an alkali metal, or $NH_4$. Subscript r is an integer selected from at least 0 or 1 and at most 6, 5, 4, 3, or even 2. Subscript t is an integer selected from at least 0 or 1 and at most 6, 5, 4, 3, or even 2. Subscript p is an integer selected from at least 1 and at most 6, 5, 4, 3, or even 2.

Exemplary fluorinated vinyl ethers include partially fluorinated vinyl ethers and perfluorinated fluorinated vinyl ethers such as: $CF_2=CF-O-(CF_2)_3-O-CF_2-COOM$, $CF_2=CF-O-(CF_2)_2-O-CF_2-COOM$, $CF_2=CF-O-(CF_2)-(O-CF[CF_3]-CF_2)-O-CF(CF_3)-COOM$, $CF_2=CF-O-(CF_2)_2-(O-CF[CF_3]-CF_2)-O-CF(CF_3)-COOM$, $CF_2=CF-O-(CF_2)_3-(O-CF[CF_3]-CF_2)-O-CF(CF_3)-COOM$, $CF_2=CF-O-(CF_2)_2-CH_2-COOM$, $CF_2=CF-O-(CH_2)-(CF_2)_2CH_2-COOM$, $CF_2=CF-O-(CF_2)_4-SO_3M$, and combinations thereof where M is H, an alkali metal, or $NH_4$.

Fluorinated allyl ethers include those of formulas:

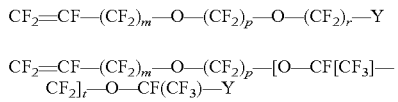

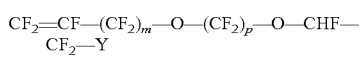

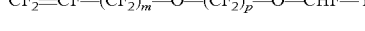

$CF_2=CF-(CF_2)_m-O-(CF_2)_p-O-CHF-Y$ $CF_2=CF-(CF_2)_m-O-(CF_2)_p-CH_2-Y$ and where Y is COOM or $SO_3M$. M is H, an alkali metal, or $NH_4$. Subscript m is an integer selected from at least 1 and at most 6, 5, 4, 3, or even 2. Subscript r is an integer selected from at least 0 or 1 and at most 6, 5, 4, 3, or even 2. Subscript t is an integer selected from at least 0 or 1 and at most 6, 5, 4, 3, or even 2. Subscript p is an integer selected from at least 1 and at most 6, 5, 4, 3, or even 2.

Exemplary fluorinated allyl ethers include partially fluorinated allyl ethers and perfluorinated fluorinated allyl ethers such as $CF_2=CFCF_2-O-(CF_2)_3-O-CF_2-COOM$, $CF_2=CFCF_2-O-(CF_2)_2-O-CF_2-COOM$, $CF_2=CFCF_2-O-(CF_2)-[O-CF(CF_3)-CF_2]-O-CF(CF_3)-COOM$, $CF_2=CFCF_2-O-(CF_2)_2-[O-CF(CF_3)]-CF_2]-O-CF(CF_3)-COOM$, $CF_2=CFCF_2-O-(CF_2)_3-[O-CF(CF_3)-CF_2]-O-CF(CF_3)-COOM$, $CF_2=CFCF_2-O-(CF_2)_2-CH_2-COOM$, $CF_2=CFCF_2-O-(CF_2)_2-O-CHF-COOM$, and combinations thereof where M is H, an alkali metal, or $NH_4$.

Fluorinated olefins include those of formula:

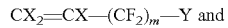

$CX_2=CX-(CF_2)_m-Y$ and

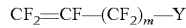

$CF_2=CF-(CF_2)_m-Y$ where X is independently selected from H, F, or $CF_3$ and Y is COOM or $SO_3M$. M is H, an alkali metal, or $NH_4$. Subscript m is an integer selected from at least 1 and at most 6, 5, 4, 3, or even 2. In one embodiment, at least one of X in the fluorinated olefin is a H. In one embodiment, at least one of X in the fluorinated olefin contains a F atom.

Exemplary fluorinated olefins include partially fluorinated olefins and perfluorinated olefins such as: $CH_2=CF-(CF_2)-COOM$, $CF_2=CH-(CF_2)-COOM$, $CH_2=CF-(CF_2)_2-COOM$, $CF_2=CF-(CF_2)-COOM$, $CF_2=CF-(CF_2)-SO_3M$, and combinations thereof where M is H, an alkali metal, or $NH_4$.

In one embodiment, the polymerizable fluorinated emulsifier is selected from the group consisting of:

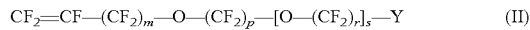

$$CF_2=CF-(CF_2)_m-O-(CF_2)_p-[O-(CF_2)_r]_s-Y \quad (II)$$

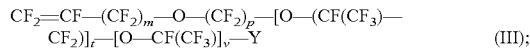

$$CF_2=CF-(CF_2)_m-O-(CF_2)_p-[O-(CF(CF_3)-CF_2)]_t-[O-CF(CF_3)]_v-Y \quad (III);$$

and

$$CX_2=CX-(CF_2)_m-Y \quad (IV)$$

where X is independently selected from H, F, or $CF_3$; where Y is COOM or $SO_3M$, m is an integer selected from 0-5, except in the case of Formula (IV) where m is an integer selected from 1-5, p is at least 1, r is an integer selected from 0-5, s is an integer selected from 1-5, t is an integer selected from 1-5, v is an integer selected from 1-5, and M is H, an alkali metal, or $NH_4$.

Exemplary polymerizable fluorinated emulsifiers of the present disclosure include: $CF_2=CF-O(-CF_2)_p-O-CF_2-COOM$ where p is 1, 2, 3, 4, 5, or 6; $CF_2=CF-CF_2-O-(-CF_2)_p-[O-CF_2-(CF_2)_u-COOM$ where p is 1, 2, 3, 4, 5, or 6 and u is 0 or 1; $CF_2=CF-O-CF_2COOM$; $CF_2=CF-O-(CF_2)_p-O-CF(CF_3)-COOM$ where p is 1, 2, 3, 4, 5, or 6; and $CF_2=CF-O-(CF_2)_p-SO_3M$ where p is 1, 2, 3, 4, or 5; and $CF_2=CF-O-(CF_2)_p-SO_3M$ where p is 1, 2, 3, 4, 5, or 6; and M is H, an alkali metal, or $NH_4$.

The polymerizable fluorinated emulsifiers of the present disclosure have non-telogenic activity meaning that less than 50%, 40%, 30%, 20%, 10%, 5%, 1%, or even none of the carbon bonds are to hydrogen. In other words, the polymerizable fluorinated emulsifier does not act like a chain transfer agent and consequently does not reduce the molecular weight of the resulting polymer. The polymerizable fluorinated emulsifiers of the present disclosure are polymerized into the polymer backbone and do not terminate the polymerization.

In the polymerization of the present disclosure, the polymerizable fluorinated emulsifiers mentioned above are used in the aqueous emulsion polymerization of one or more perfluorinated monomers.

The amount of polymerizable fluorinated emulsifier used may vary depending on desired properties such as amount of solids, particle size, etc. Generally, the amount of polymerizable fluorinated emulsifier is kept to a level, which is sufficient to stabilize the fluoropolymer dispersion. Typically, the amount of polymerizable fluorinated emulsifier will be at least 50, 100, 200, 300, 400, or even 500 ppm (parts per million) and based on the total amount of perfluorinated monomer used. If unnecessarily large amounts of fluorinated polymerizable emulsifier are used, the resulting fluoropolymer may be difficult to coagulate and/or work-up and may also impact the properties of the final polymer, for example, thermal stability or discoloration. Typically, the amount of polymerizable fluorinated emulsifier will be at most 750, 1000, 2000, 4000, 5000, or even 10000 ppm based on the total amount of perfluorinated monomer used.

The polymerization of the present disclosure is an aqueous emulsion polymerization, meaning that polymerization occurs in polymer particles dispersed in water which are electronically stabilized by an emulsifier. Aqueous emulsion polymerization can be carried out continuously in which, for example, monomers, water, optionally further emulsifiers, buffers and catalysts are fed continuously to a stirred reactor under optimum pressure and temperature conditions while the resulting emulsion is removed continuously. An alternative technique is batch or semibatch (semi-continuous) polymerization characterized by feeding the ingredients into a stirred reactor and allowing them to react at a set temperature for a specified length of time or by charging ingredients into the reactor and feeding the monomers into the reactor to maintain a constant pressure until a desired amount of polymer is formed. The polymerization can be carried out in a standard or conventional vessel used for emulsion polymerization of gaseous fluorinated monomers.

In one embodiment, the polymerizable fluorinated emulsifier is added continuously during the polymerization. Although not wanting to be bound by theory, it is believed that by continuously adding the polymerizable fluorinated emulsifier during polymerization, higher solids can be achieved. It is thought that because the stabilizing polar groups are covered by growing polymer chains and thus, are unable to contribute to the colloidal stability, it may be important to constantly have stabilizing polar groups at the polymer surface and thus, the polymerizable fluorinated emulsifier may be added continuously during polymerization. In one embodiment, it is preferable to stop the addition of the polymerizable fluorinated emulsifier prior to the end of the polymerization, in order to ensure that the polymerizable fluorinated emulsifier is completely incorporated into the polymer and to avoid treatment of waste water streams.

In one embodiment, it may be desirable to add a certain monomer to the polymerization in the form of an aqueous emulsion. For example, perfluorinated co-monomers that are liquid under the polymerization conditions may be advantageously added in the form of an aqueous emulsion. The emulsion of such co-monomers is preferably prepared using the polymerizable fluorinated emulsifier. If a portion of the polymerizable fluorinated emulsifier is batch-charged prior to polymerization start, it is optional to use "doped" polymerizable fluorinated emulsifiers. Where the doped polymerizable fluorinated emulsifier are microemulsions with fluorinated, low telogenic, inert liquids with boiling points higher than 100° C. Examples of such liquids include: (i)

fluorinated cyclic hydrocarbons, such as octafluoronaphthalene, octafluorotoluene, hexafluorobenzene, perfluoroperhydrophenantrene ($C_{14}F_{24}$), perfluoroperhydrofluorene ($C_{13}F_{22}$), perfluoro decalin ($C_{10}F_{18}$), perfluoro methyl decalin ($C_{11}F_{20}$), perfluoro butyl decalin ($C_{14}F_{26}$), perfluorodimethylcyclohexane ($C_8F_{16}$), perfluoromethylcyclohexane ($C_7F_{14}$), perfluorodimethylcyclobutane ($C_6F_{12}$); (ii) fluorinated polyoxyalkenes of the formula $CF_2\!\!=\!\!CF\!-\!(CF_2)_1\!-\!O(R^a_f O)_n (R^b_f O)_m R^c_f$, where $R^a_f$ and $R^b_f$ are different perfluoroalkylene groups of 3 to 6 C-atoms, $R_{cf}$ is a perfluoroalkyl group of 1 to 6 C-atoms, l is 0 or 1, m and n are independently 0 to 10 and n+m is >2 or >3, examples include: $CF_3\!-\!CF_2\!-\!CF_2\!-\!(O\!-\!CF(\!-\!CF_3)\!-\!CF_2)_2\!-\!O\!-\!CF\!\!=\!\!CF_2$ (PPVE-3), $CF_3\!-\!CF_2\!-\!CF_2\!-\!(O\!-\!CF(\!-\!CF_3)\!-\!CF_2)_3\!-\!O\!-\!CF\!\!=\!\!CF_2$ (PPVE-4), $CHF_2\!-\!CF_2\!-\!CF_2\!-\!(O\!-\!CF(\!-\!CF_3)\!-\!CF_2)\!-\!O\!-\!CF\!\!=\!\!CF_2$ (HPPVE-2), $CHF_2\!-\!CF_2\!-\!CF_2\!-\!(O\!-\!CF(\!-\!CF_3)\!-\!CF_2)_2\!-\!O\!-\!CF\!\!=\!\!CF_2$ (HPPVE-3); (iii) fluorinated alkenes of the formula $F_3C\!-\!C(R^d_f)\!\!=\!\!C(R^e_f)(R^f_f)$ where $R^d_f$ and represent $R^e_f$ independently from each other fluorine or a perfluorinated or partially fluorinated, linear or branched alkyl group, preferably a group having from 1 to 6, preferably 1 to 3, carbon atoms and $R^f_f$ represents a perfluorinated, linear or branched alkyl group of 1 to 6 carbon atoms, preferably a methyl, ethyl, propyl or isopropyl group, examples include: $C(\!-\!CF_3)(\!-\!CF_3)\!\!=\!\!CF\!-\!CF_2\!-\!CF_3$ (HFP-Dimer), and $C(\!-\!CF_3)_2\!\!=\!\!C(\!-\!CF_2\!-\!CF_3)(\!-\!CF(\!-\!CF_3)_2)$ (HFP-Trimer); and (iv) fluorinated polyoxyalkanes of the formula $R^g_f\!-\!O\!-\!R^h_f\!-\!O\!-\!R^i_f$ where $R^g_f$ and $R^i_f$ are independently fluorinated alkyl groups of 2 to 5 C-atoms and $R^h_f$ is a branched perfluorinated alkyl group of 2 to 4 C-atoms atoms, examples include: $CHF_2\!-\!CF_2\!-\!CF_2\!-\!O\!-\!CF(\!-\!CF_3)\!-\!CF_2\!-\!O\!-\!CFH\!-\!CF_3$ (HTFEE-2), $CHF_2\!-\!CF_2\!-\!CF_2\!-\!O\!-\!CF(\!-\!CF_3)\!-\!CF(\!-\!CF_3)\!-\!O\!-\!CF_2\!-\!CF_2\!-\!CHF_2$, and $CF_3\!-\!CF_2\!-\!CF_2\!-\!O\!-\!CF(\!-\!CF_3)\!-\!CF(\!-\!CF_3)\!-\!O\!-\!CF_2\!-\!CF_2\!-\!CF_3$. See for example, U.S. Pat. Publ. No. 2011/0294951 (Hintzer et al.), herein incorporated by reference.

The aqueous emulsion polymerization may be carried out at temperatures between 10 to 100° C., or even 30° C. to 80° C. and the pressure is typically between 2 and 50 mbar, or even 5 to 30 bar. The reaction temperature may be varied during the polymerization to influence the molecular weight distribution, i.e., to obtain a broad molecular weight distribution or to obtain a bimodal or multimodal molecular weight distribution.

The aqueous emulsion polymerization is typically initiated by an initiator including any of the initiators known for initiating a free radical polymerization of fluorinated monomers. The initiators of the polymerization system are selected such that the polymer endgroups are the same as the polymerizable fluorinated emulsifier; e.g. $KMnO_4$ generates $COO^-$ endgroups, while APS/bisulfite systems partially generate $SO_3^-$ endgroups.

Suitable initiators include peroxides and azo compounds and redox based initiators. Specific examples of peroxide initiators include, hydrogen peroxide, sodium or barium peroxide, diacylperoxides such as diacetylperoxide, disuccinoyl peroxide, dipropionylperoxide, dibutyrylperoxide, dibenzoylperoxide, benzoylacetylperoxide, diglutaric acid peroxide and dilaurylperoxide, and further per-acids and salts thereof such as e.g. ammonium, sodium or potassium salts. Examples of per-acids include peracetic acid. Esters of the peracid can be used as well and examples thereof include tert-butylperoxyacetate and tert-butylperoxypivalate. Examples of inorganic initiators include for example ammonium- alkali- or earth alkali salts of persulfates, permanganic or manganic acid. A persulfate initiator, e.g. ammonium persulfate (APS), can be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate (sold for example under the trade designation "RONGALIT") or fluoroalkyl sulfinates as disclosed in U.S. Pat. No. 5,285,002 (Grootaert). The reducing agent typically reduces the half-life time of the persulfate initiator. Additionally, a metal salt catalyst such as for example copper, iron or silver salts may be added. The amount of initiator may be between 0.01% by weight and 1% by weight based on the fluoropolymer solids to be produced. In one embodiment, the amount of initiator is between 0.05 and 0.5% by weight. In another embodiment, the amount may be between 0.05 and 0.3% by weight. The full amount of initiator may be added at the start of the polymerization or the initiator can be added to the polymerization in a continuous way during the polymerization. Preferably the initiator is added until a conversion of monomer to polymer of 70% to 80% is achieved. One can also add part of the initiator at the start and the remainder in one or separate additional portions during the polymerization.

The aqueous emulsion polymerization system may further comprise other materials, such as buffers and, if desired, complex-formers or chain-transfer agents. Examples of chain transfer agents that can be used include dimethyl ether, methyl t-butyl ether, alkanes having 1 to 5 carbon atoms such as ethane, propane and n-pentane, halogenated hydrocarbons such as $CCl_4$, $CHCl_3$ and $CH_2Cl_2$; hydrofluorocarbon compounds such as $CH_2F\!-\!CF_3$ (R134a); alcohols; esters; and the like.

Examples of fluorinated monomers that may be polymerized using the polymerizable fluorinated emulsifier as an emulsifier: include tetrafluoroethylene (TFE), chlorotrifluoroethylene (CTFE), hexafluoropropylene (HFP), dichlorodifluoroethylene, and perfluorinated alkyl vinyl monomers such as perfluorinated vinyl ethers (PVE) and perfluorinated allyl ethers, perfluoro-5-oxa-hept-6-ene sulphonic acid fluoride (MV4S), $CF_2\!\!=\!\!CFO(CF_2)_5CN$ (MV5CN), and combinations thereof.

Suitable perfluoroalkyl vinyl monomers correspond to the general formula: $CF_2\!\!=\!\!CF\!-\!R^d_f$ or $CH_2\!\!=\!\!CH\!-\!R^d_f$ wherein $R^d_f$ represents a perfluoroalkyl group of 1-10, or even 1-5 carbon atoms.

Examples of perfluorovinyl ethers that can be used in the present disclosure include those that correspond to the formula: $CF_2\!\!=\!\!CF\!-\!O\!-\!R_f$ wherein $R_f$ represents a perfluorinated aliphatic group that may contain no, one or more oxygen atoms and up to 12, 10, 8, 6 or even 4 carbon atoms. Exemplary perfluorinated vinyl ethers correspond to the formula: $CF_2\!\!=\!\!CFO(R^a_f O)_n (R^b_f O)_m R^c_f$ wherein $R^a_f$ and $R^b_f$ are different linear or branched perfluoroalkylene groups of 1-6 carbon atoms, in particular 2-6 carbon atoms, m and n are independently 0-10 and $R^c_f$ is a perfluoroalkyl group of 1-6 carbon atoms. Specific examples of perfluorinated vinyl ethers include perfluoro (methyl vinyl) ether (PMVE), perfluoro (ethyl vinyl) ether (PEVE), perfluoro (n-propyl vinyl) ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3\!-\!(CF_2)_2\!-\!O\!-\!CF(CF_3)\!-\!CF_2\!-\!O\!-\!CF(CF_3)\!-\!CF_2\!-\!O\!-\!CF\!\!=\!\!CF_2$.

Examples of perfluoroallyl ethers that can be used in the present disclosure include those that correspond to the formula: $CF_2=CF(CF_2)-O-R_f$ wherein $R_f$ represents a perfluorinated aliphatic group that may contain no, one or more oxygen atoms and up to 10, 8, 6 or even 4 carbon atoms. Specific examples of perfluorinated allyl ethers include: $CF_2=CF_2-CF_2-O-(CF_2)_nF$ wherein n is an integer from 1 to 5, and $CF_2=CF_2-CF_2-O-(CF_2)_x-O-(CF_2)_y-F$ wherein x is an integer from 2 to 5 and y is an integer from 1 to 5.

The resulting fluoropolymers of the present disclosure are highly fluorinated. As used herein, "highly fluorinated" means that the repeating monomer units of the resulting polymer are perfluorinated (i.e., do not comprise any carbon-hydrogen bonds), however the fluoropolymer may comprise some carbon-hydrogen bonds, which originate from the fluorinated polymerizable emulsifier used, the initiator system employed, and/or the chain transfer agent, if used.

The resulting highly fluorinated polymer may be a fluoroplastic, amorphous fluoropolymer, or a PTFE (polytetrafluoroethylene). Exemplary polymers that would benefit from the methods as disclosed herein include: copolymers of TFE and HFP (FEP polymers); perfluoroalkoxy copolymers (PFA polymers); amorphous perfluorinated polymers, such as those available under the trade designation "TEFLON AF"; melt processable fluoropolymers available under the trade designation "HYFLON MFA" by Solvay S.A., Ixelles, Belgium; PTFE micropowders (i.e., PTFE having a low molecular weight, e.g., less than 5 million grams/mole); and PTFE fine powders (i.e., those having a molecular weight, e.g., greater than 5 million grams/mole).

In one embodiment, the polymerization of the present disclosure is substantially free of a non-polymerizable fluorinated emulsifier (e.g. perfluoroalkanoic acids, fluorinated ethers and alkoxy ethers). In other words, less than 25 ppm, 10 ppm, 1 ppm, or even 0.1 ppm of a non-polymerizable fluorinated emulsifier is in the final latex.

The aqueous emulsion polymerization described herein results in a dispersion of the highly fluorinated polymer particles in water (also known as a latex). Generally the amount of solids of the fluoropolymer in the dispersion directly resulting from the polymerization will vary between 3% by weight and about 40% by weight depending on the polymerization conditions. A typical range is between 5 and 30% by weight. The particle size (z-average particle size) of the fluoropolymer is typically between 50 nm and 350 nm with a typical particle size being between 100 nm and about 300 nm.

Because the polymerizable fluorinated emulsifier is polymerized into the highly fluorinated polymer of the present disclosure, in one embodiment, the resulting latex has a low amount (in other words, less than 100 ppm, 50 ppm, 25 ppm, 10 ppm, or even 1 ppm of the polymerizable fluorinated emulsifier is in the final latex) or is substantially free of the polymerizable fluorinated emulsifier.

After polymerization, the resulting latex may be upconcentrated to increase the solid content. Non-ionic surfactants (e.g., those sold under the trade designations of "TRITON" and "GENAPOL") may be used in amounts of 2 to 10% by weight of the non-ionic surfactant to further upconcentrate the latex to a solid content of 40-60% as is known in the art. See for example, U.S. Pat. No. 6,833,403 (Bladel et al.) and C.A. Pat. No. 2522837 (Bladel et al.).

Alternatively, or in addition to upconcentrating the latex, the fluoropolymer particles may be isolated from the dispersion by coagulation and dried. Such coagulation methods are known in the art and include chemical and physical methods, for example, using an electrolyte or inorganic salt (such as HCl, $H_2SO_4$, $HNO_3$, $H_3PO_4$, $Na_2SO_4$, $MgCl_2$, ammonium carbonate, etc.), using freeze-thaw cycles, applying high sheer, and/or applying ultrasonics.

In one embodiment, the process described herein may be used to generate seed polymer particles, which can be used to initiate a subsequent polymerization. Briefly, small particles of fluoropolymer could be prepared using the polymerizable fluorinated emulsifier disclosed herein. These seed particles typically have a z-average diameter of between 50 to 100 nm (nanometers). Such seed particles may be produced in a separate aqueous emulsion polymerization and may be used in an amount of 5 to 50% by weight based on the weight of water in the aqueous emulsion polymerization. Using a seed particle, in one embodiment may result in a core-shell particle, with the core of the particle comprising a different composition than the shell or outer surface of the particle. In one embodiment, the shell comprises a fluoropolymer having a low melting point (for example less than 150° C.) or is amorphous. Such an embodiment would enable a core-shell particle to be made without the addition of additional emulsifier, including the polymerizable fluorinated emulsifier disclosed herein or another non-telogenic or even telogenic emulsifier.

In another embodiment, the process described herein may be used to generate a fully polymerized polymer particle, wherein no further polymerization is conducted on the polymer particles.

The polymerizable fluorinated emulsifiers of the present disclosure comprise at least one ionic group. During polymerization, these polymerizable fluorinated emulsifiers are incorporated into the resulting polymer and some of these groups may be accessible for quantitation and thermal instability. The ionic groups can be detected by techniques as is known in the art, including Fourier Transform Infrared (FTIR) spectroscopy as disclosed in U.S. Pat. No. 3,085,083 (Schreyer) or by titration.

The ionic groups may lead to cracking, blistering, or corrosion at high processing temperatures (e.g., greater than 350° C.) and/or result in higher metal contents in articles made from the high fluorinated polymers of the present disclosure. Therefore, depending on the requirements of the application in which the resulting highly fluorinated polymer is to be used, the highly fluorinated polymer of the present disclosure may be post-fluorinated so as to convert any thermally unstable groups from the polymer as well as from any residual polymerizable fluorinated emulsifier into stable $CF_3$ end groups.

In one embodiment, there is no need for post treatment to remove the polymerizable fluorinated emulsifier from the fluoropolymer latex, and/or the waste water streams since the polymerizable fluorinated emulsifier is polymerized into the highly fluorinated polymer.

Post-fluorination techniques are known in the art. Described in for example EP 222945 (Buckmaster et al.), U.S. Pat. No. 6,541,588 (Kaulbach), or DE 199 03 657 (Kaulbach et al.), herein incorporated by reference. Briefly, the coagulated fluoropolymer is subjected to an atmosphere containing fluorine (typically diluted down to 5-20% in a carrier gas, such as nitrogen) to convert unstable end groups, if present in unsuitable amounts, to stable fluorinated end groups (such as to —$CF_3$ groups). Generally, the mixture is heated at a temperature below the melting range of the polymer, for example 50 to 250° C. or even 100-180° C. The fluorination is continued until at least 90-95% of all polar groups are removed. For example, the fluoropolymer will be post fluorinated such that the amount of polar end groups in the fluoropolymer other than $CF_3$ is less than 80 per million carbon atoms, less than 40 per million carbon atoms, or even less than 20 ppm per million carbon atoms.

Not only will the post fluorination assist with removal of the —C(O)OH and —S(O)(O)OH groups, but it may also treat groups include —C(O)NH$_2$, —C(O)OR, CH$_2$OH, —CF=CF$_2$, and —C(O)F groups, which may appear during processing (e.g., exposure to heat or ammonia) or from the presence of the initiator used.

The post-fluorination of the dried polymer, may be conducted on agglomerates, melt-pellets, or even films. Post-fluorination of agglomerates is beneficial compared to melt-pellets since there is no abrasion from the reactors enabling low metal-contents and the fluorination times are shorter. Post-fluorinated agglomerates can be melt-pelletized later on.

If polymer polymerized with SO$_3^-$-containing polymerizable fluorinated emulsifier are post-fluorinated, the fluorination may take longer time, nevertheless the fluorination conditions should be selected that the melt-flow index (MFI) should not change more than 10% compared to the non-post-fluorinated material.

Because the highly fluorinated polymer is post-fluorinated to remove ionic end groups, in one embodiment, the metal ion content of the resulting polymer may be low. For example, less than 500 ppb (parts per billion), or even less than 100 ppb of metal ions such as Na, Ca, Al, Fe, Cr, Ni, and W. The metal ion content can be determined by combustion and induction coupled plasma (ICP) analysis.

In the present disclosure, the polymerizable fluorinated emulsifier is used to stabilize the growing polymer during polymerization. Yet, a low level of polymerizable fluorinated emulsifier is used along with post-fluorination, so that the resulting properties of the final highly fluorinated polymer are substantially the same as those which were polymerized with a non-polymerizable fluorinated emulsifier. For, example, after post-fluorination, the melting point of the highly fluorinated polymer made as disclosed herein with a polymerizable fluorinated emulsifier, should be substantially the same, (i.e., less than 5° C., 4° C., 3° C., or even 2° C. difference) than the same polymer made with a non-polymerizable non-telogenic fluorinated emulsifier (e.g., perfluoroalkanoic acids and their salts or fluorinated ethoxylated carboxylic acids and their salts).

In one embodiment of the present disclosure, the resulting dried highly fluorinated polymer made by the processes disclosed herein is substantially free of a non-polymerizable fluorinated emulsifier. In other words, the highly fluorinated polymer comprises less than 10 ppm, 5 ppm, 1 ppm, 0.5 ppm, 0.1 ppm, 50 ppb (parts per billion) 10 ppb or even no non-polymerizable fluorinated emulsifier. The amount of non-polymerizable fluorinated emulsifiers in the polymer can be determined by volatizing or extracting the emulsifiers from the highly fluorinated polymer using techniques known in the art.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, kg=kilograms, min=minutes, mol=mole; cm=centimeter, mm=millimeter, ml=milliliter, L=liter, psi=pressure per square inch, MPa=megaPascals, and wt=weight.

Methods

Melt Flow Index (MFI)

The MFI of the fluoropolymers, reported in g/10 min, was measured at a temperature of 372° C. following a method similar to that described in DIN EN ISO 1133 with a support weight of 5.0 kg. The MFI was obtained with a standardized extrusion die of 2.095 mm diameter and a length of 8.0 mm.

Melting Point

Melting peaks of the fluoropolymers were determined following a method similar to that described in ASTM 4591 by means of Perkin-Elmer DSC 7.0 (Perkin-Elmer, Waltham, Mass.) under nitrogen flow and a heating rate of 10° C./min. The indicated melting points relate to the melting peak maximum.

Particle Size Determination

The latex particle size determination was conducted by means of dynamic light scattering (Malvern Zetasizer 1000 HAS, Malvern, UK) following a method similar to that described in ISO/DIS 13321. The reported average particle size is the z-average. Prior to the measurements, the latexes as yielded from the polymerisations were diluted with 0.001 mol/L KCl-solution, and the measurement temperature was 20° C. in all cases.

Total Endgroup

The amount of carbonyl content (e.g., COO$^-$/COF) was conducted by the integrated absorbance ratio a FTIR spectrum of the fluoropolymer using a Fa Nicolet DX510 FTIR spectrometer using OMNIC software (ThermoFisher Scientific, Waltham, Mass.) using techniques as described in EP Pat. No. 222945 (Buckmaster et al.), U.S. Pat. No. 4,687,708 (Betzar) and U.S. Pat. No. 4,675,380 (Buckmaster et al.).

PPVE Content

The amount of perfluoro (n-propyl vinyl) ether (PPVE) interpolymerized in the resulting polymer was calculated from the ratio of the PPVE absorbance at 993 cm$^{-1}$ to a reference peak at 2365 cm$^{-1}$ using FTIR. The ratio of these two peaks multiplied by 0.95 gives the % (m/m) PPVE. The remainder of the resulting polymer was interpolymerized TFE.

Polymerizable Fluorinated Emulsifier Determination

A BF$_3$ methanol complex was used to derivatize the CF$_2$=CF—O—(CF$_2$)$_3$—O—CF$_2$—COO$^-$ molecule in the dispersion to its methylester form. The content of the polymerizable fluorinated emulsifier in the latex sample was determined by headspace gas chromatography with a mass spectrometer detection. A fused silica capillary column having an inner diameter of 0.32 mm coated with a 1% vinyl/5% phenyl/94% dimethyl polysiloxane (1.8 μm film thickness) was used. The results are reported as the methyl ester form.

Comparative Example A

The polymerization experiment was performed in a 40-L kettle equipped with an impeller agitator and a baffle. The kettle was evacuated and then charged with 30 L of deionized water and set to 63° C. Into the oxygen free kettle, 210 g (30%) of a non-polymerizable fluorinated emulsifier ([$CF_3$—O—($CF_2$)$_3$—O—CHF—$CF_2$—C(O)O$^-$NH$^{4+}$, prepared as described in U.S. Pat. No. 7,671,112 Hintzer, et al.) was added under stirring. The kettle was pressurized with TFE up to 13 bar, after which, 0.1 bar of ethane (a chain transfer agent) and 190 g of PPVE were added. The polymerization was started with 1.3 g APS (ammonium persulfate, (NH$_4$)$_2$S$_2$O$_8$). Over the course of polymerization 7.5 kg TFE and 300 g PPVE were consumed during 4 hrs.

This process yielded a latex having a solid content of 21% by wt and an average particle size of 81 nm. The measured composition of the resulting polymer was 4.3 wt % PPVE and 95.7 wt % TFE.

The polymer was coagulated by the addition of HCl, washed, and then dried. The dried polymer had a melting point of 306° C., MFI (372° C./5 kg)=1.9 g/10 min, and a total endgroups amount of 70 ppm.

Example 1

The same set-up and similar conditions as described in Comparative Example A was used with the following exceptions. The non-polymerizable fluorinated emulsifier was replaced by 10.9 g of $CF_2$=CF—O—($CF_2$)$_3$—O—$CF_2$—COO$^-$Na$^+$ (which was received as in its methylester form from Anles/St. Petersburg, Russia and converted in-house to the sodium salt form). 5 g of the $CF_2$=CF—O—($CF_2$)$_3$—O—$CF_2$—COO$^-$Na$^+$ was precharged into the kettle at the start of polymerization and the remainder was continuously fed into the reactor until 2 kg of the TFE was consumed. The polymerization was started with 0.7 g of APS. After 4.5 hrs, 3.4 kg of TFE and 120 g of PPVE were consumed.

This process yielded a latex having a solid content of 9.6% by weight, and an average particle size of 75 nm. The amount of polymerizable fluorinated emulsifier in the latex was determined following the polymerizable fluorinated emulsifier determination method above. The latex was found to comprise 2 µg/g of the polymerizable fluorinated emulsifier. The measured composition of the resulting polymer was 4.1 wt % PPVE and 95.9 wt % TFE.

The polymer was coagulated by the addition of HCl, washed and then dried. The dried polymer had a melting point of 302° C., MFI (372° C./5 kg)=75 g/10 min, and a total endgroup amount of 450 ppm.

100 g of the coagulated and dried polymer from above was post-fluorinated at 215° C. with a 90 to 10 ratio of N$_2$ to F$_2$ for a total of 300 min. The resulting polymer had a melting point of 303° C., MFI (372° C./5 kg)=72 and a total endgroup amount of 53.

Example 2

The same set-up and similar conditions as described in Comparative Example A was used with the following exceptions. The non-polymerizable fluorinated emulsifier was replaced by 21 g of $CF_2$=CF—O—($CF_2$)$_4$SO$_3$NH$_4$ (prepared from $CF_2$=CF—O—($CF_2$)$_4$SO$_2$F as disclosed in U.S. Pat. No. 6,624,328 (Guerra) and converted to the ammonium salt form). After 5 h 3.8 kg TFE and 150 g PPVE were consumed.

This process yielded a latex having a solid content of 12% by weight, and an average particle size of 80 nm. The measured composition of the resulting polymer was 3.9 wt % PPVE and 6.1 wt % TFE.

Foreseeable modifications and alterations of this invention will be apparent to those skilled in the art without departing from the scope and spirit of this invention. This invention should not be restricted to the embodiments that are set forth in this application for illustrative purposes. To the extent that there is a conflict or discrepancy between this specification and the disclosures incorporated by reference herein, this specification will control.

What is claimed is:

1. An aqueous mixture comprising:
a polymerization product of a perfluorinated monomer and a polymerizable fluorinated emulsifier wherein the polymerizable fluorinated emulsifier is selected from the group consisting of:
$CF_2$=CF—O—($CF_2$)$_p$—O—($CF_2$)$_r$—Y where Y is COOM or SO$_3$M, p is an integer selected from at least 3 and at most 6, r is an integer selected from at least 1 and at most 6, and M is H, an alkali metal, or NH$_4$,
wherein the resulting polymer comprises a perfluorinated backbone.

2. The aqueous mixture of claim 1, wherein the perfluorinated monomers are selected from the group consisting of: tetrafluoroethylene, hexafluoropropylene, perfluoroalkoxy alkenes, perfluoro alkyl vinyl ethers, perfluoroalkoxy vinyl ethers, perfluoro-5-oxa-hept-6-ene sulphonic acid fluoride, $CF_2$=CFO($CF_2$)$_5$CN, and combinations thereof.

3. The aqueous mixture of claim 1, wherein the aqueous mixture is substantially free of a non-polymerizable fluorinated emulsifier.

4. The aqueous mixture of claim 1, wherein the aqueous mixture is substantially free of saturated fluorinated emulsifier.

5. The aqueous mixture of claim 1, wherein the polymerizable fluorinated emulsifier is $CF_2$=CF—O—($CF_2$)$_3$—O—$CF_2$—COOM, where M is H, an alkali metal, or NH$_4$.

6. The aqueous mixture of claim 1, wherein an amount of polymerizable fluorinated emulsifier is at least 50 parts per million based on a total amount of the perfluorinated monomer.

7. The aqueous mixture of claim 1, wherein an amount of polymerizable fluorinated emulsifier is at most 10000 parts per million based on a total amount of the perfluorinated monomer.

* * * * *

UNITED STATES PATENT AND TRADEMARK OFFICE
CERTIFICATE OF CORRECTION

PATENT NO.       : 9,938,403 B2
APPLICATION NO.  : 14/992223
DATED            : April 10, 2018
INVENTOR(S)      : Klaus Hintzer Page 1 of 1

It is certified that error appears in the above-identified patent and that said Letters Patent is hereby corrected as shown below:

In the Specification

<u>Column 3,</u>
Line 57, delete "r" and insert -- t --, therefor.

<u>Column 7,</u>
Line 32, before "examples" delete "atoms,".
Line 41, delete "50 mbar," and insert -- 50 bar, --, therefor.
Line 61, delete "dilaurylperoxide," and insert -- dilauroylperoxide, --, therefor.

Signed and Sealed this
Second Day of October, 2018

Andrei Iancu
*Director of the United States Patent and Trademark Office*